United States Patent [19]
Maltby

[11] 3,986,689
[45] Oct. 19, 1976

[54] DRIVE ARRANGEMENTS FOR AIRCRAFT CONTROL SURFACES

[75] Inventor: Peter John Maltby, Codsall, England

[73] Assignee: Lucas Industries Limited, Birmingham, England

[22] Filed: Nov. 4, 1975

[21] Appl. No.: 628,598

Related U.S. Application Data

[63] Continuation-in-part of Ser. No. 529,232, Dec. 3, 1974, abandoned.

[30] Foreign Application Priority Data

Dec. 11, 1973 United Kingdom............... 57311/73

[52] U.S. Cl.................................. 244/42 D; 64/6; 91/33
[51] Int. Cl.[2]......................................... B64C 13/28
[58] Field of Search........... 244/42 R, 42 D, 42 DA, 244/75 R, 78, 83 J; 64/1 R, 6; 74/485; 91/6, 33; 116/114 AC, 115, 124 A, 124 C

[56] References Cited
UNITED STATES PATENTS

| | | | |
|---|---|---|---|
| 1,971,590 | 8/1934 | Zaparka............................ | 244/42 D |
| 2,524,853 | 10/1950 | Szekely................................ | 64/1 R |
| 2,774,555 | 12/1956 | Crawford et al.................. | 244/42 D |
| 2,791,385 | 5/1957 | Johnson............................. | 244/42 D |
| 3,138,010 | 6/1964 | Shipley et al. ....................... | 64/1 R |

Primary Examiner—Trygve M. Blix
Assistant Examiner—Barry L. Kelmachter
Attorney, Agent, or Firm—Holman & Stern

[57] ABSTRACT

A drive arrangement for an aircraft control surface has an inner shaft extending through a hollow outer shaft. The inner and outer shafts are drivingly connected at their adjacent ends. A drive input is coupled to the outer shaft intermediate the ends thereof, and an actuator for a control surface is drivingly connected to the outer shaft between the drive input and one of the ends. The arrangement permits the actuator to be driven even if the outer shaft fractures between the actuator and the drive input.

12 Claims, 6 Drawing Figures

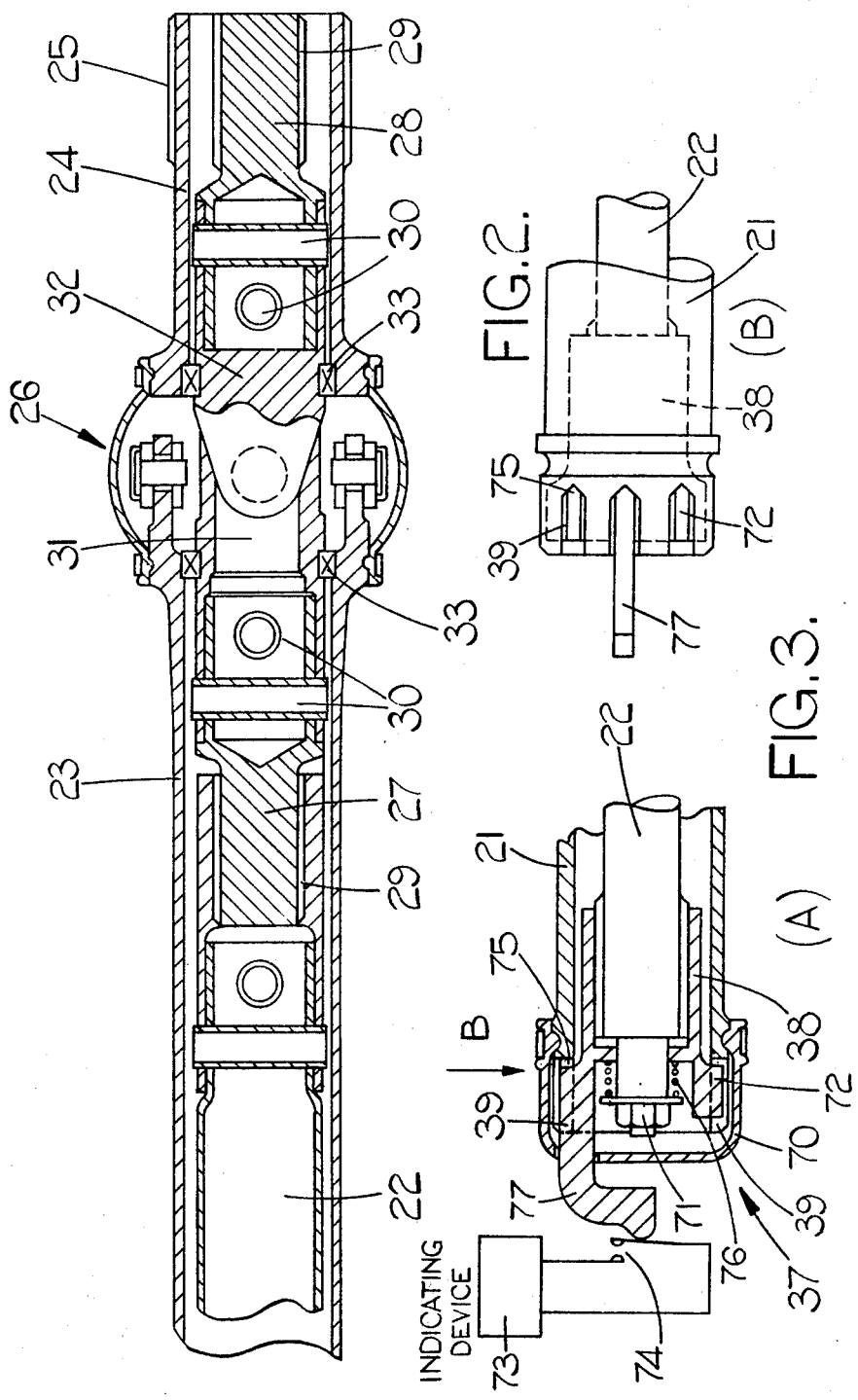

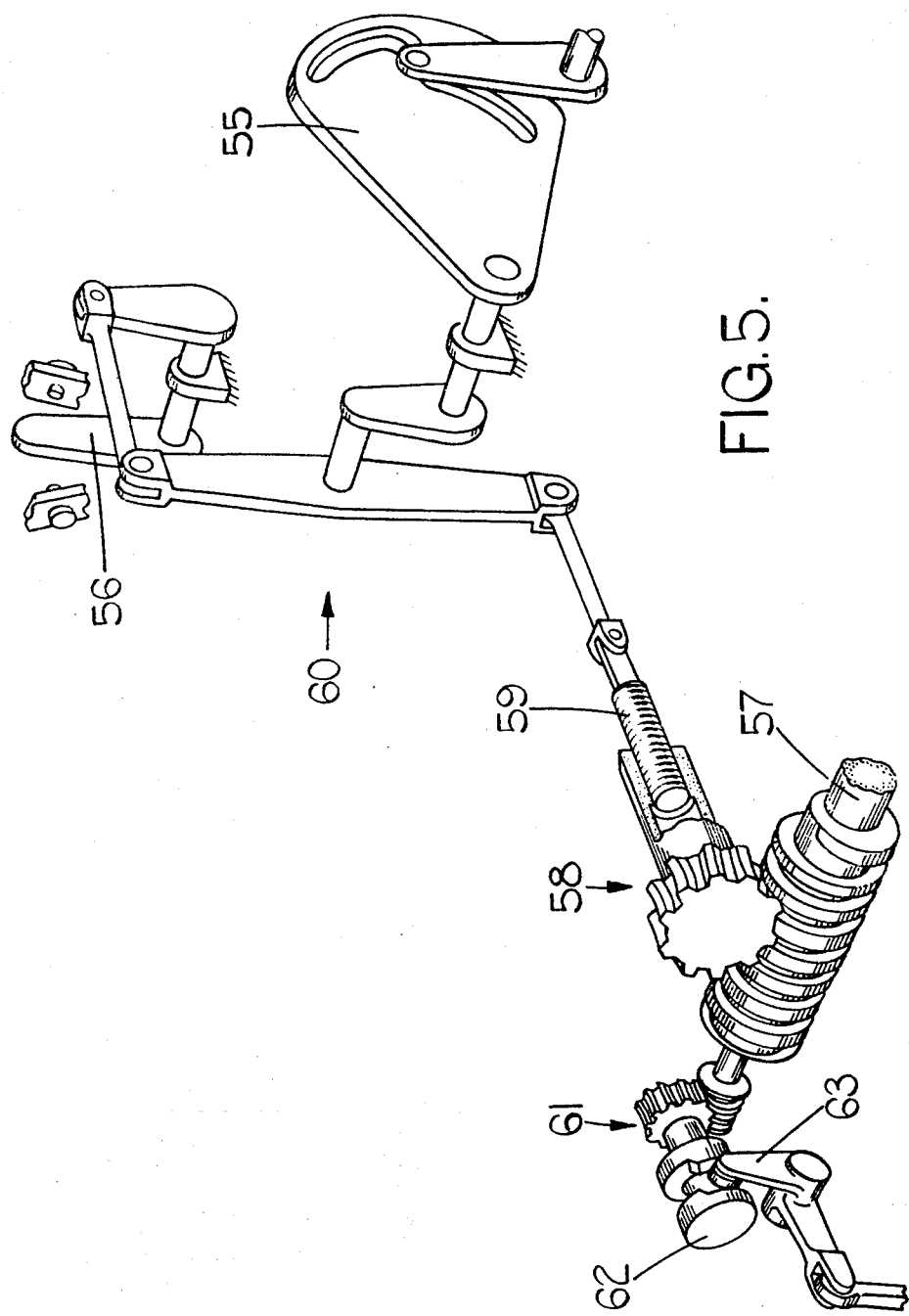

DRIVE ARRANGEMENTS FOR AIRCRAFT CONTROL SURFACES

This application is a Continuation-in-Part of copending U.S. patent application Ser. No. 529,232, filed Dec. 3, 1974, now abandoned.

The invention relates to drive arrangements for aircraft control surfaces.

According to the invention a drive arrangement for an aircraft control surface comprises an outer, hollow shaft arrangement, an inner shaft arrangement extending within said outer shaft arrangement, means for drivingly connecting both ends of said outer shaft arrangement to corresponding adjacent ends of said inner shaft arrangement, drive means coupled to said outer shaft arrangement intermediate the ends thereof, and an actuator for said control surface, said actuator being drivingly connected to said outer shaft arrangement intermediate one end thereof and said drive means.

In a preferred embodiment of the invention said outer and inner shaft arrangements respectively comprise a plurality of flexibly coupled shaft elements.

Figure 1:
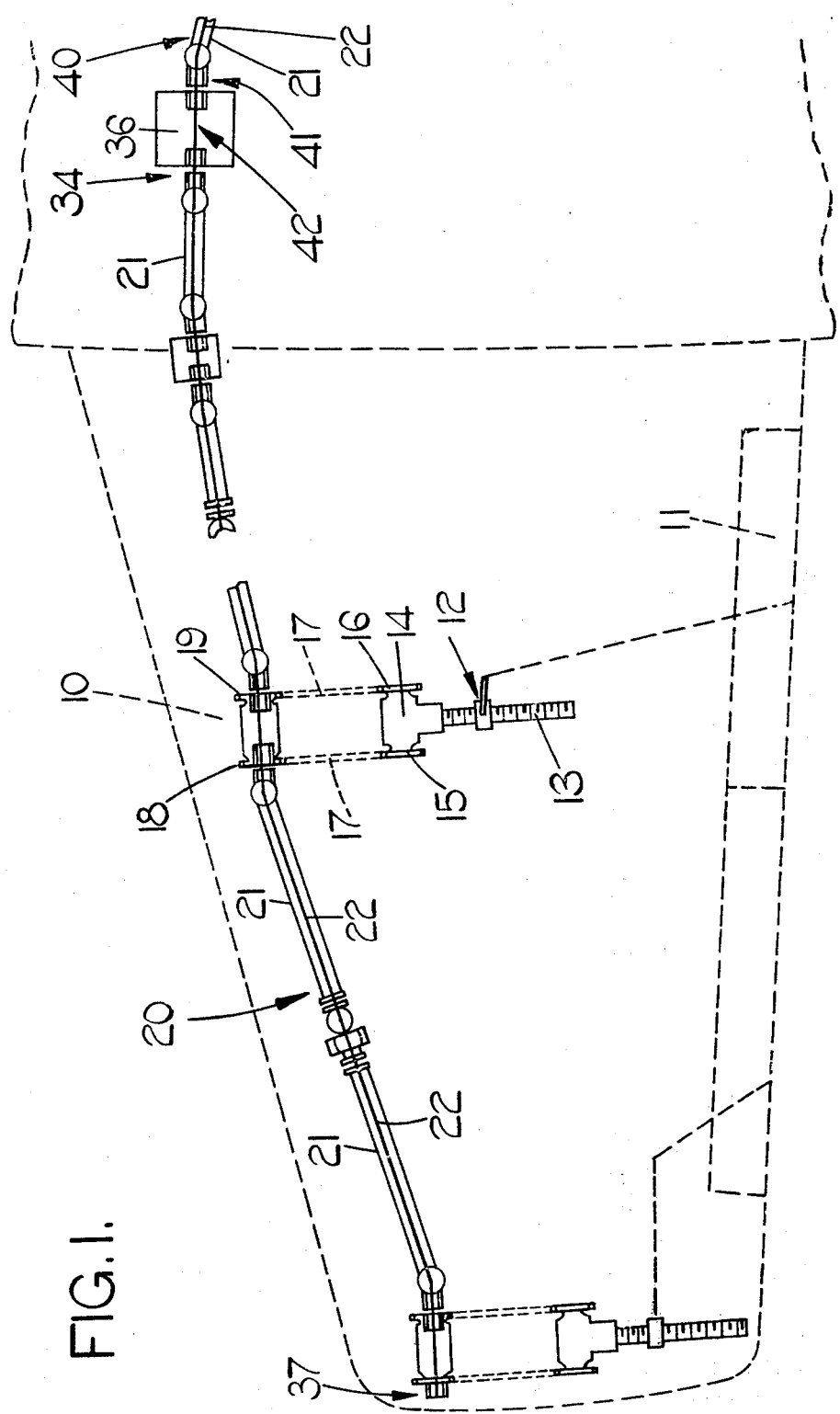
Figure 4:
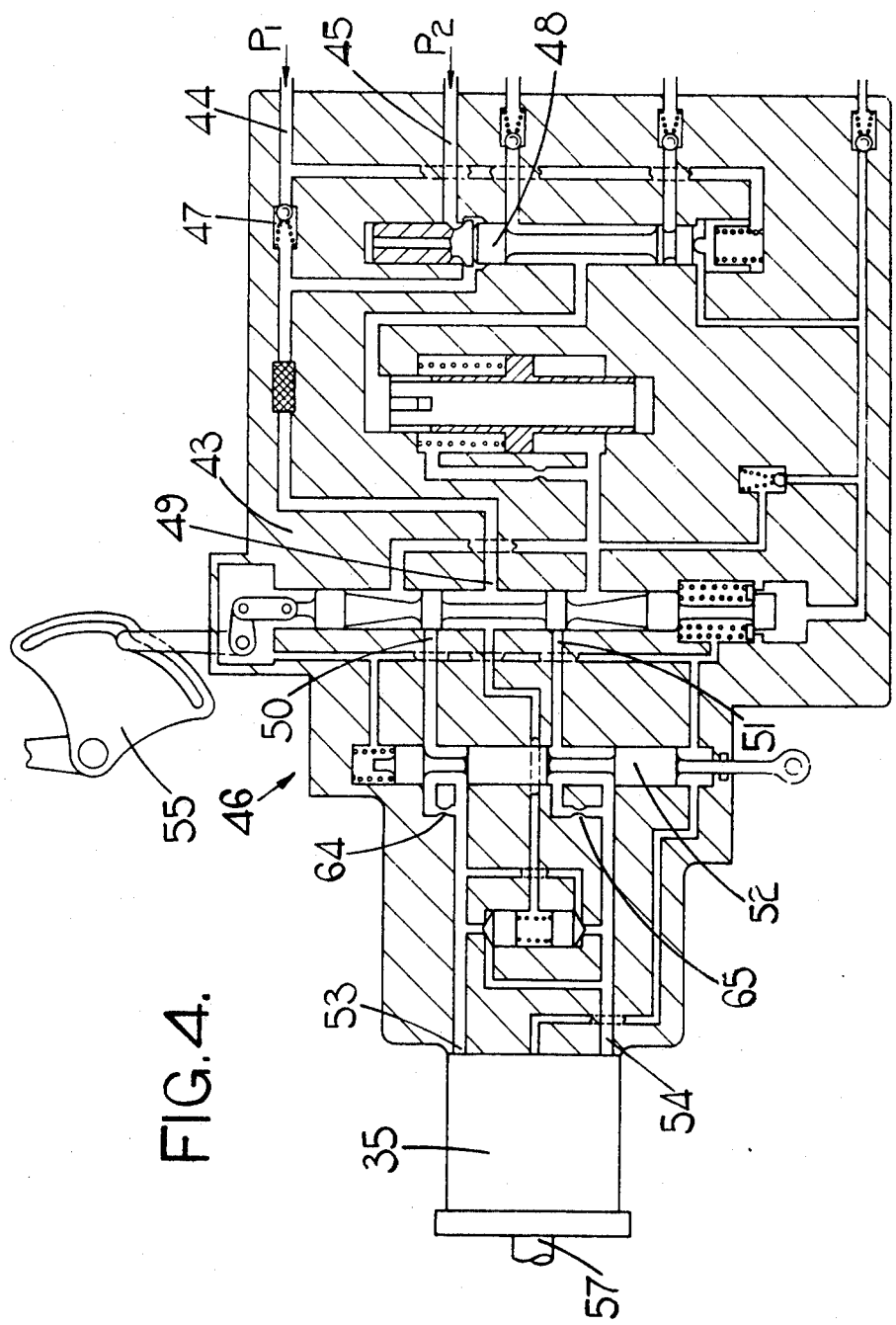

An example of the invention will now be described with reference to the accompanying drawings in which:

FIG. 1 shows a general layout of a drive arrangement for flaps on an aircraft wing, FIG. 2 shows, to an enlarged scale, a coupling between adjacent drive elements of FIG. 1, FIG. 3A shows, also to an enlarged scale, an interconnection between inner and outer drive elements, FIG. 3B is a view on arrow B in FIG. 3A, with a cover removed for clarity, and FIGS. 4 and 5 show diagrammatically a drive unit forming part of FIG. 1.

In FIG. 1 an aircraft wing 10 has mounted thereon a flap 11 which is movable on the wing 10 between retracted and extended positions. Flap 11 is movable by a recirculating ball nut and lead-screw arrangement 12, the lead-screw 13 of which is driven by a gear arrangement 14 having two input sprocket wheels 15, 16 which are normally rotated in unison, via drive chains 17, for respective sprocket wheels 18, 19 mounted on a drive shaft arrangement 20.

Shaft arrangement 20 has a plurality of outer shaft elements 21 through which inner shaft elements 22 extend coaxially. Adjacent ends of shaft elements 21 are flexibly coupled together as shown in FIG. 2. Adjacent ends of inner shaft elements 22 are similarly flexibly coupled.

FIG. 2 shows the ends 23, 24 of two outer shaft elements. End 24 is, in fact, connected to the remainder of the corresponding outer shaft element (not shown) by means of splines 25. Shaft element ends 23, 24 are interconnected by a Hooke's coupling indicated at 26.

FIG. 2 also shows ends 27, 28 of adjacent inner shaft elements 22. Ends 27, 28 engage the remaining portions of their respective shaft elements by means of splines 29. Ends 27, 28 are secured by spring pins 30 to respective parts 31, 32 of a bowl-type universal coupling. Coupling parts 31, 32 are supported within the respective shaft element ends 23, 24 by roller bearings 33.

The free end 34 of an outer shaft element 21 at one end of shaft arrangement 20 is drivingly connected to a hydraulic motor 35 forming part of a drive unit 36, shown in detail in FIGS. 4 and 5. The other end 37 of shaft arrangement 20 is shown in detail in FIG. 3. The inner shaft element 22 at end 37 includes a collar 38 which is in splined engagement with the remainder of shaft element 22 and which has projections 72 engaged in recesses 39 in the adjacent portion of outer shaft element 21.

A shaft arrangement 40, identical with shaft arrangement 20, extends along the opposite wing (not shown) of the aircraft. One or more lead-screw arrangements are drivingly connected to the shaft arrangement 40 in a like manner to the connection of lead-screw arrangement 12 to shaft arrangement 20. An outer shaft element at end 41 of shaft arrangement 40 is drivingly connected to drive unit 36, so that the outer shaft elements of arrangements 20, 40 are normally rotated in unison. The end of shaft arrangement 40 remote from drive unit 36 has its inner and outer shaft elements drivingly interconnected, in a like manner to that previously described with reference to FIG. 3. The inner shaft elements 22 of both shaft arrangements 20, 40 are directly interconnected, as indicated at 42.

As shown in FIGS. 4 and 5 drive unit 36 includes a control valve arrangement 43. Two normally identical supply pressures P1, P2 are applied to control valve arrangement 43 via respective passages 44, 45. Passages 44, 45 are respectively connected to a spool control valve 46 via a nonreturn valve 47 and a change-over valve 48.

Valve 48 includes a spool subjected at its respective ends to the pressures P1 and P2, so that passage 45 can communicate with the downstream side of valve 47 only when pressure P2 is higher than pressure P1. In this condition valve 47 is urged shut by pressure P2. When pressure P1 is higher than pressure P2 valve 47 opens, and pressure P1 is prevented from discharging to passage 45 by the valve 47. Valves 47 and 48 thus act so that the higher of pressures P1, P2 is applied to an inlet 49 of valve 46. Valve 46 is operable to apply the pressure at inlet 49 to either one of a pair of outlet ports 50, 51. Ports 50, 51 are connected via a flow-limiting valve 52 to respective ports 53, 54 of the hydraulic motor 35. The spool control member of valve 46 is movable by a cam 55 (also shown in FIG. 5). Cam 55 is pivotally movable in response to the difference between the position of a pilots flap setting demand lever 56 and the position of an output shaft 57 of motor 35. The outer shaft elements 21 at ends 34, 41 of shaft arrangements 20, 40 respectively (FIG. 1) are drivingly connected to shaft 57.

The position of shaft 57 is applied to cam 55 by means of a worm and wheel 58, the wheel threadedly engaging a stem 59 which is coupled to one end of a differential linkage 60, the other end of linkage 60 being coupled to the pilots lever 56.

A further worm and wheel 61 on shaft 57 drives a cylindrical cam 62 which is engaged by a follower 63 coupled to the control element of restrictor valve 52, cam 62 is such that, between rotational positions of shaft 57 corresponding to predetermined positions of the flaps 11, flow to and from the motor 35 passes via restrictors 64, 65. Speed of flap movement between these limiting positions is thereby reduced.

In use the flaps 11 are normally driven by motor 35 via the outer shaft elements 21. Should any of the outer shaft elements in the shaft arrangement 40 fracture, drive will continue to be applied by the motor 35 to the outer shaft elements between the motor 35 and the fractured element. Furthermore, drive will be applied from the motor to the outer shaft elements 21 of the shaft arrangement 20, via the interconnection between the shaft elements 21, 22 at end 37 of shaft arrangement 20, via the inner shaft elements 22 and via the driving connection between shaft elements 21, 22 at the end of shaft arrangement 40 remote from motor 35, to drive the remaining shaft elements 21 in arrangement 40.

The aircraft flaps can thus continue to be driven by motor 35 providing that failure is restricted to the outer shaft elements 21 of only one of the shaft arrangements 20, 40. It will be understood that failure or disconnection of any of the inner shaft elements 22 will normally have no adverse effects on the operation of the arrangement.

It is conveniently provided that the connection between the inner and outer shaft elements, at the end of arrangement 40 remote from motor 35, are such as to permit a small degree or relative rotation or backlash, between the inner and outer shaft elements. Since there is normally no load on the inner shaft elements, this backlash will not, in fact, be taken up so as to cause relative rotation, unless one of the outer shaft elements fractures.

In a further embodiment, it is arranged that the driving connection between the inner and outer shaft elements of either of arrangements 20, 40 may be disconnected, whereby the inner and outer elements can be relatively rotated for the purpose of testing or of setting up the indicating device referred to above. This disconnection may be effected, as shown in FIG. 3, by removing a protective cap 70 and unscrewing a nut 71 so that the splined collar 38 may be withdrawn from its engagement with outer shaft element 21 and inner shaft element 22.

Conveniently there is provided an indicating device 73 of any known kind, which is responsive to relative rotation, of more than a predetermined amount, between the inner and outer shaft elements. As shown in FIGS. 3(A) and 3(B), the indicating device 73 is energised by a switch 74 which is responsive to axial movement of the splined collar 38. The projections 72 on collar 38 are provided with V-shaped axially extending teeth 75 which are biased by a spring 76 into engagement with complementary indentations at the ends of the recesses 39. The collar 38 has an extension 77 which coacts with the switch 74. Relative rotation between the shaft elements 21, 22 causes collar 38 to move leftwardly, as shown in the drawings, closing switch 74.

I claim:

1. A drive arrangement for an aircraft control surface, comprising an outer, hollow shaft arrangement, an inner shaft arrangement extending within said outer shaft arrangement, means for drivingly connecting both ends of said outer shaft arrangement to corresponding adjacent ends of said inner shaft arrangement, the driving connection between one of said outer shaft ends and its adjacent inner shaft end including first and second abutment members respectively rotatable with the inner and outer shafts, said members coacting so as to permit only limited relative movement between said shafts, drive means coupled to said outer shaft arrangement intermediate the ends thereof, and an actuator for said control surface, said actuator being drivingly connected to said outer shaft arrangement intermediate one end thereof and said drive means.

2. An arrangement as claimed in claim 1 in which said outer and inner shaft arrangements respectively comprise a plurality of flexibly-coupled shaft elements.

3. An arrangement as claimed in claim 1 in which one of said abutment members can be disconnected from its driving engagement with the other of said abutments members.

4. An arrangement as claimed in claim 1 which includes means, responsive to relative rotation between said abutment members, for generating an electrical signal.

5. An arrangement as claimed in claim 1 in which said actuator comprises a lead screw drivingly connected to said outer shaft arrangement, and a nut for connection to an aircraft control surface.

6. An arrangement as claimed in claim 1 which includes a plurality of said actuator arrangements.

7. An arrangement as claimed in claim 6 in which said actuator arrangements are disposed on opposite sides of said drive means.

8. An arrangement as claimed in claim 1 in which said drive means comprises a hydraulic motor having two flow connections, means for applying the higher of a pair of nominally identical supply pressures to said motor, and a first valve for selectively applying said higher pressure to one of said connections and for connecting the other of said connections to a return line.

9. An arrangement as claimed in claim 8 which includes means, responsive to a difference between desired and actual driven positions of said outer shaft arrangement, for operating said valve.

10. An arrangement as claimed in claim 9 in which the means for operating said valve comprises a mechanical linkage.

11. An arrangement as claimed in claim 8 which includes means, responsive to predetermined driven positions of said outer shaft arrangement, for limiting fluid flow to said motor.

12. An arrangement as claimed in claim 11 in which said flow-limiting means comprises a further valve in series between said motor and said first valve, and a linkage, operable by said outer shaft arrangement in predetermined angular positions thereof, for operating said further valve.

* * * * *